Sept. 25, 1956     A. R. KNIGHT     2,764,698

CONTROL SYSTEM

Filed Nov. 23, 1942     3 Sheets-Sheet 1

INVENTOR
ARTHUR R. KNIGHT
BY William D. Hall
ATTORNEY

Sept. 25, 1956  A. R. KNIGHT  2,764,698
CONTROL SYSTEM
Filed Nov. 23, 1942  3 Sheets-Sheet 2
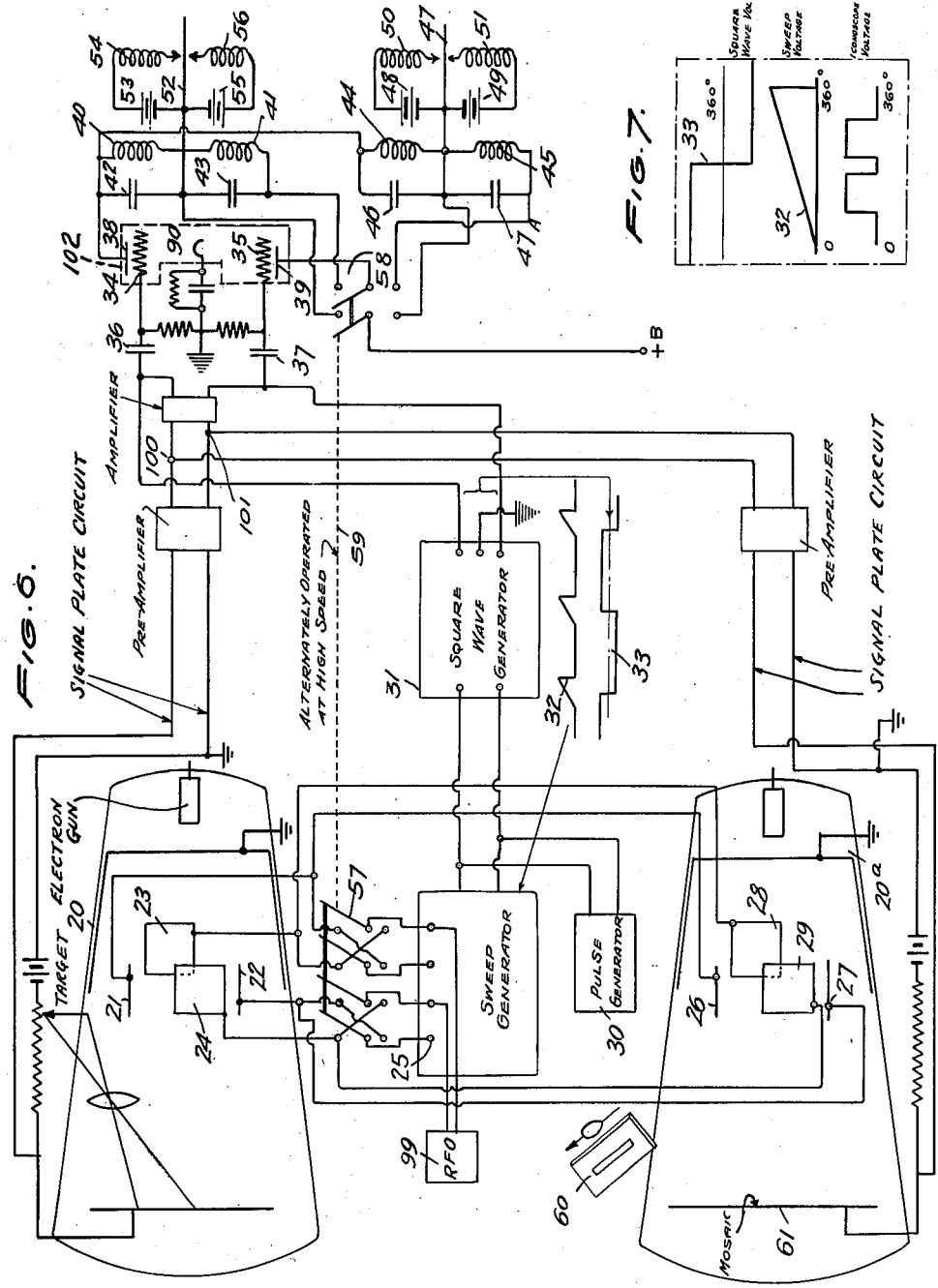
INVENTOR
ARTHUR R. KNIGHT
BY William D. Hall
ATTORNEY Sept. 25, 1956  A. R. KNIGHT  2,764,698
CONTROL SYSTEM
Filed Nov. 23, 1942  3 Sheets-Sheet 3
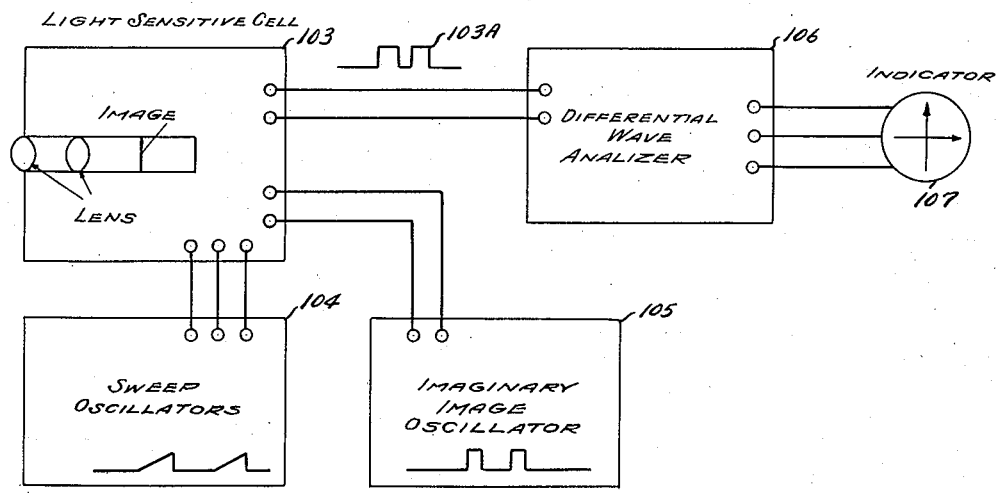
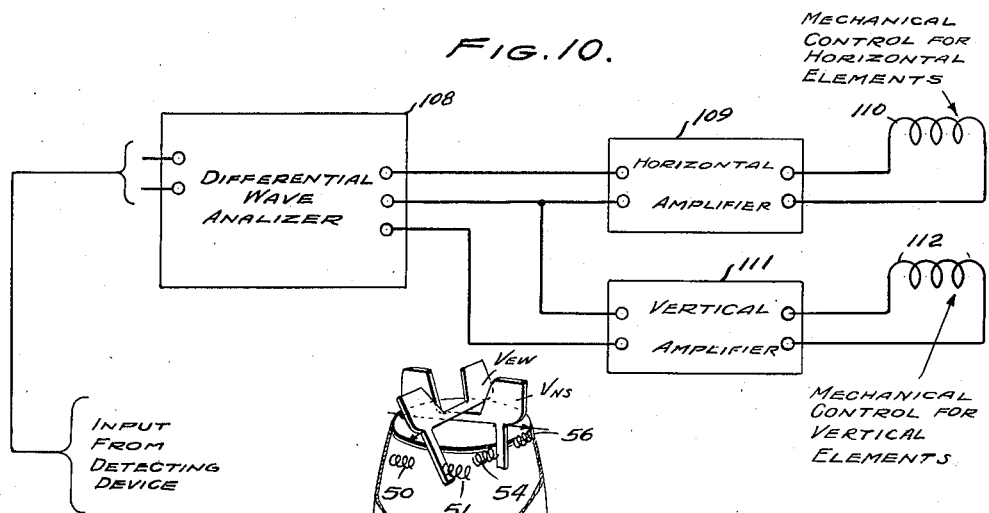
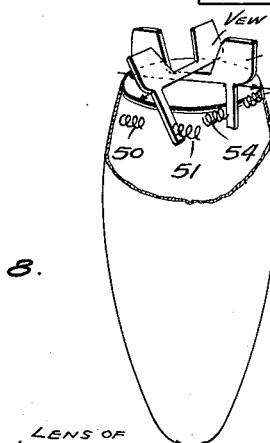
INVENTOR
ARTHUR R. KNIGHT
BY William D. Hall
ATTORNEY United States Patent Office 2,764,698
Patented Sept. 25, 1956

2,764,698
CONTROL SYSTEM
Arthur R. Knight, Dayton, Ohio
Application November 23, 1942, Serial No. 466,972
8 Claims. (Cl. 250—214)
(Granted under Title 35, U. S. Code (1952), sec. 266)

The invention described herein may be manufactured and used by or for the Government for governmental purposes, without the payment to me of any royalty thereon.

This invention relates to systems of indication and/or control and more particularly to indication or control of direction whereby an object may be guided to a predetermined location.

One object of this invention is to provide improved means of indication and/or control. Another object is to provide means for guiding an object into a source of electromagnetic radiation. Another object is to provide means of direction control in which the device controlled is guided in several directions.

The invention may be utilized in conjunction with various types of moving bodies incorporating direction control means. The principal application of the invention is for guiding a bomb which has been released from an aircraft into a source of radiations such as a battleship, searchlight, power plant or the like. Another application is for guiding a water-borne torpedo boat into an enemy warship. Still another application resides in the guidance and landing of aircraft.

The principle underlying my invention will be described very precisely as it is applied to the mode of use which at present appears to be the most important and best. The radiations of the target toward which the device is to be guided are intercepted by an iconoscope of well known form. The image impressed on the iconoscope is swept by the beam and the image resulting on one half of the mosaic is compared in intensity with that on the other half. Assuming as would be the case on a dark night or on a day in which confusing reflections were absent that the radiating target to be destroyed by the bomb emits large quantities of infra-red light, it will set up a voltage in the iconoscope circuit. If the image of the object to be destroyed appears on one side of the center of the mosaic the voltage will be increased while that side is being swept. A comparison of the voltage intensities on the respective halves of the mosaic indicates which side of the true line of direction the bomb is traveling. This invention provides automatic means, hereinafter described, for making this comparison and controlling the bomb to cause it to travel on the true line.

When the bomb is dropped from aircraft it must be controlled in two directions whereas when the bomb is in the form of a water-borne boat only control in one plane of direction is necessary. For effectuating control of direction in two planes, the horizontal and vertical sweep circuits of the iconoscope are reversed intermittently and the output of the comparison means is likewise synchronously alternated between the vanes that respectively control the bomb in different directions.

In the drawings:

Figure 6 illustrates the circuit diagram of one form of my invention.

Figure 7 illustrates the time relationship of the square wave voltage of the circuit, the sweep voltages of the iconoscope, and the differential output voltages of the two iconoscopes.

Figure 8 illustrates a bomb having the invention thereon.

Figure 9 is a block diagram of my invention when used with an indicator.

Figure 10 is a block diagram of my invention when used to operate the direction control means of an aircraft.

Figure 1:
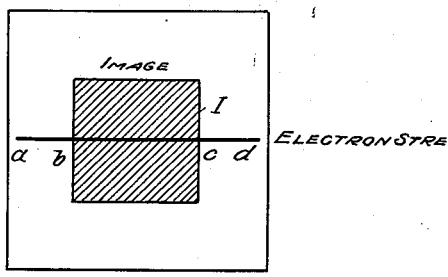
Figure 1 is a view of the mosaic of the iconoscope with the image, in this case the target, shown thereon.
Figure 2:
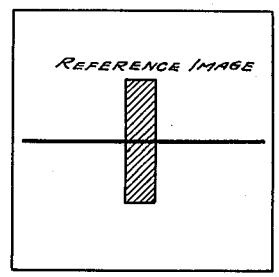
Figure 2 is a similar view of a reference image on another iconoscope for purposes that will appear later.
Figure 3:
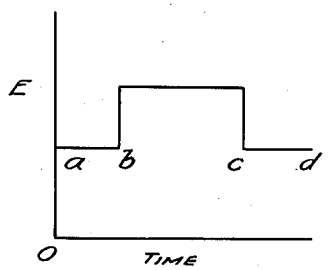
Figure 3 illustrates the relationship of light intensity with respect to time for the iconoscope mosaic of Figure 1.
Figure 4:
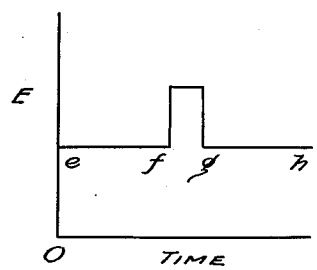
Figure 4 illustrates the relationship of the light intensity with respect to time for the iconoscope mosaic of Figure 2.

Referring now to Figure 1 it is apparent that the target is square and located directly at the center of the mosaic. This is done for purposes of illustration only. As the beam sweeps from points $a$ to $b$ it is assumed that a dark background is swept. From points $b$ to $c$ the target emanates radiations which causes an increase in voltage at the iconoscope. From $c$ to $d$ there is a dark background. The voltage variation (not the actual voltage) is illustrated in Figure 3. Figure 4 illustrates the variation in light with respect to time on the second iconoscope of Figure 2. This iconoscope is exposed only to a reference image centered on the mosaic.

Figure 5:
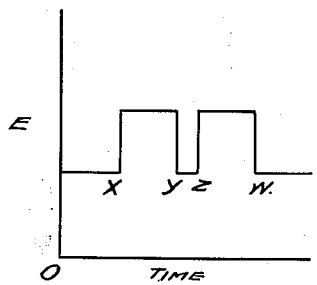
Figure 5 illustrates the differential light intensity with respect to time of the two iconoscope mosaics represented in Figures 1 and 2.

The differential light intensity of the two iconoscopes is illustrated in Figure 5 which shows two main surges of energy, which are transformed into corresponding surges of voltage. These two surges of voltage are compared with each other and when one is stronger than the other the vanes of the bomb are operated to change the course of the bomb.

Apparatus for carrying out the invention as just described is illustrated in Figure 6. In this figure the iconoscope 20 has two horizontal plates 21 and 22 and vertical plates 23 and 24. By horizontal and vertical plates, I do not mean they have such relationship with respect to the earth because to so view them would be misleading. I call them horizontal and vertical simply because custom permits understanding of the operation when the plates are thus described. A sweep generator 25 energizes the horizontal and vertical plates of iconoscope 20. A second iconoscope 20ᵃ has plates 26, 27, 28 and 29 that are respectively electrically in parallel with plates 21, 22, 23 and 24. A pulse generator 30 is provided to supply pulses to the sweep generator 25 and synchronously to square wave generator 31. It is noted that as shown in Figure 7 the sweep circuit and the square wave voltage are so related that the square wave voltage changes polarity precisely at the instant the iconoscope beam sweeps past the center line of the mosaic.

The signal plate circuits of iconoscopes 20 and 20ᵃ are connected in opposition at points 100 and 101. The differential output of the iconoscopes is then amplified and fed into the control circuit. Before discussing the controls circuits, a disclosure of the functions of iconoscopes 20 and 20ᵃ will be made. Iconoscope 20 corresponds to the iconoscope of Figure 1. That is, the image of the target and its surroundings is impressed on this iconoscope. On iconoscope 20ᵃ only the reference image of Figure 2 is impressed. Iconoscope 20ᵃ is inclosed and is subject to illumination only through a slitted member 60 from a light source. The light falling on mosaic 61 of this iconoscope therefore has the shape shown in Figure 2.

The control circuit for comparing the surges x—y and z—w of Figure 5 will now be described by reference particularly to Figure 6. The control circuit includes a dual triode tube 102 having a common cathode 90, two grids 34 and 35 respectively controlling current to two anodes 38 and 39, and two sets of two relay coils 40, 41 and 44, 45. When the switch 58 is in its up closed position, the coils 44 and 45 are inoperative and this condition will be assumed for the time being solely for purposes of description. The square wave generator 31 alternately blocks grids 34 and 35 thus forming a gating circuit means. During the first half of the time required to sweep each line of mosaic 61, the grid 34 is blocked, but current can freely flow from cathode 90 to plate 39 in a degree depending on the magnitude of the surge x—y of Figure 5. During the second half of the time required to sweep each line of mosaic 61, the grid 35 will block flow of current from cathode 90 to plate 39 but grid 34, not being blocked, will permit flow of current to plate 38 to a degree depending on the magnitude of the surge z—w of Figure 5. Thus the double triode 102 and its control grid operating means, including the square wave generator, the sweep generator and the iconoscope 20ᵃ (or an equivalent device capable of producing the square pulse of Figure 4), provides electronic switching means applying energy derived from the mosaic during a first half of each line sweep to one of the coils 40, 41 (or 44, 45, depending on the instantaneous position of switch 58) and to the other of said coils during the remaining half of each line sweep.

As long as current flows to plate 38, coil 40 is energized accordingly and as long as current flows to plate 39 the coil 41 is energized accordingly. Irregularities in the energizations of coils 40 and 41 are evened by integrating condensers 42 and 43 respectively, which form therewith integrating means for the current from plates 38 and 39, whereby the armature 52 is attracted one way or the other depending on which of coils 40 or 41 has the greatest average energization. When coil 41 has the greater average energization, the pivoted armature 52 energizes the coil 54 through battery 53. When coil 40 has the greater average energization, the coil 56 is energized through battery 55. For purposes of illustration, assume that a bomb is dropping in a true vertical path. Coil 54 is arranged to turn the vane $V_{NS}$ in one direction to deflect the bomb so it falls north of the vertical line, while coil 56 operates the vane $V_{NS}$ to cause the bomb to travel on the south side of the vertical line. Coil 50 operates a second vane $V_{EW}$ to cause the bomb to travel east of the vertical line and coil 51 operates the second vane $V_{EW}$ to cause the bomb to travel west of the vertical line. As will appear later, a bomb does not fall in a true vertical path and moreover the bomb may spin as it falls but the above illustration of the operation of coils 54, 56, 50 and 51 enables one skilled in the art to identify these parts and their cooperative relationship with the vanes in the manner known to the art.

The switching member 59 alternately and intermittently operates reversing switches 57 and 58 to their respective opposite positions. When switch 59 is reversed from its present position, the sweep voltage applied to plates 21, 22 is shifted to plates 23, 24; and that applied to plates 23, 24 shifted to 21, 22. In effect, when switches 57 and 58 are in a down position, the iconoscope 20 is shifted from what has been termed for illustration purposes "horizontal" sweeping to "vertical" sweeping. Likewise, coils 40, 41 are rendered inoperative and coils 44 and 45 are brought into play.

Hence when the beam of iconoscope 20 is sweeping the image east and west (switch 59 down), the coils 44 and 45 are operative and when the beam is sweeping the image north and south the coils 40 and 41 are operative. The principle underlying the above mode of application, just described, is one of the inventive features of this patent. Stated briefly, there are two sets of controls for two vanes that respectively control the North-South direction and the East-West direction. The response of iconoscope 20 is shifted from a North-South sweep to an East-West sweep intermittently and simultaneously with the shift from the coils controlling the North-South direction to the coils controlling the East-West direction.

The frequency at which switching mechanism 59 operates the reversing switches 57 and 58 may be either greater or less than the frequency at which the complete target is scanned but preferably the period of operation of switching member 59 should be several times longer than the period required for the beam to sweep one line of the mosaic.

One of the features of this invention resides in an increase in sensitivity of the iconoscope 20 to any light emitted by the target. The sensitivity is increased in several ways any of which may be used alone or in combination. A radio frequency voltage generated by radio frequency oscillator 99 may be impressed on two of the plates. This will cause the beam to oscillate back and forth as it sweeps the mosaic. Preferably, this voltage is applied to the "horizontal" plates 21, 22 although it may be applied to the "vertical" plates. Another way of increasing the sensitivity of iconoscope 20 is to have the beam sweep the image rapidly but have long spaces between successive sweeping operations. For example, the sweep voltage 32 of Figure 6 shows three saw-tooth surges with substantial spaces. The curve 32 of Figure 6 is used for purposes of illustration only, and in carrying out my invention I normally would employe longer spaces between the saw-tooth surges as compared to the duration of the surges. The long spaces between sweeping operations is much longer than ordinarily employed in iconoscopes, but the speed at which the beam moves across the light sensitive mosaic surface is about the same as for ordinary television iconoscopes. In other words, the total time required to sweep the entire target is greatly increased but the actual time that the beam is sweeping the image is the same as for ordinary television iconoscopes. Since the photo-electric voltage output of the iconoscope depends (a) on the rate at which the beam travels and (b) on the time permitted for charges to accumulate, it may be shown mathematically that my invention which sweeps the target at the same rapid rate as ordinarily employed in present day iconoscopes but with relatively long spaces between sweeping operations, improves the sensitivity of the apparatus.

This invention is preferably used for control of bombs, although it may be used to guide aircraft or any other object. A bomb, such as shown in Figure 8, must be controlled in two planes, hence two vanes $V_{EW}$ and $V_{NS}$ respectively controlled by coils 50, 51 and 54, 56 are used. Coils 50, 51, and 54, 56 are respectively energized by batteries 48, 49, and 53, 55. The two armatures 47 and 52 are respectively controlled by coils 44, 45 and 40, 41 which are respectively shunted by integrating condensers 46, 47A and 42, 43. These latter coils and condensers form integrating means for the current from tube 102.

When my invention is used for control of bombs, it is to be noted that a bomb may spin as it falls and in such instance it is apparent that my apparatus still exercises appropriate control. Should the vane $V_{NS}$ rotate by ninety degrees as it falls, then it is in the position of vane $V_{EW}$ and the plates 21, 22, 23, 24 have likewise rotated ninety degrees and the same character of control is still maintained. Since the reversing mechanism 59 repeatedly and intermittently sensitizes the two vanes, it is apparent that the two vanes rapidly adjust themselves as the bomb spins.

When my invention is employed for control of waterborne boats to guide them into a target, only direction in one plane need be controlled. Under these circumstances, the reversing switches 59, 57, 58 and the coils 44, 45, 50, 51 and associated mechanism may be eliminated.

Use of the reference voltage of Figure 2 may be eliminated and hence iconoscope 20ᵃ may be eliminated. Iconoscope 20ᵃ is shown only for purpose of illustration as one element of the combination and in practice any ordinary pulse generator may be used to introduce this reference voltage. It is apparent from the foregoing description that my invention will work without utilizing the reference voltage of Figure 2 although I have determined that its operation is not as effective without it as with it.

Figure 9 illustrates the general combination when used for the purpose of giving left-right visual indications. The arrangement is essentially that shown schematically in Figure 6 and comprises a light sensitive cell 103, such as iconoscope 20, a sweep oscillator 104, such as sweep generator 25, and an imaginary image oscillator 105 which provides an equivalent for the function of iconoscope 20ᵃ, and, as pointed out in the preceding paragraph, may be any conventional pulse generator adapted to establish a reference voltage having a predetermined time position with respect to the voltage wave yielded by cell 103. The divided pulse output of light cell 103, such as shown by wave form 103A, is applied to a differential wave analyzer 106 which, in general, is identical with the circuit entailing dual triode 102 and square wave generator 31. The behavior of the arrangement shown in Figure 9 is in all respects the same as in Figure 6 except that the output is used to actuate an indicator in lieu of the control mechanism of a bomb. The three wires normally going to coils 40 and 41 may pass to a "ratio" meter 107 or to a center-tapped coil D'Arsonval direct current meter. Such meters will show the deviation of the moving body from its true desired course. When I speak of the word "control" I speak of it broadly so that it covers the control of the pointer of the indicator of Figure 9.

Figure 10 illustrates the arrangement of the invention when employed in conjunction with the horizontal and vertical control elements of an aircraft. A differential wave analyzer 108 is provided which is the same as that described in connection with Figure 9, and having the same input applied thereto. To effect control in both the horizontal and vertical planes, the voltage output developed across coil 40 in series with coil 41 is applied through a suitable amplifier 109 to the horizontal mechanical control means, symbolized by coil 110, while the voltage output developed across coil 44 in series with coil 45 is applied through a suitable amplifier 111 to the vertical mechanical control means 112. The operation of this system is generally similar to that described in connection with Figure 6 save that it is employed in conjunction with an aircraft.

While there has been shown what at present are considered preferred embodiments of the invention, it is to be understood that many changes and modifications may be made therein without departing from the invention. It is therefore intended in the accompanying claims to cover all such changes and modifications as fall within the true spirit and scope of the invention.

What is claimed is:

1. A radiant energy sensitive device for a steering control system comprising in combination a radiant energy sensitive surface, means to direct a target image on said surface, electron beam scanning means sweeping said surface, a pair of output circuits deriving output energy proportionate to radiations falling on said surface in response to the scaning thereof, transmission means conducting electrical energy from said surface to said output circuits, and electronic switching means in said transmission means synchronized with said electron beam scanning means applying energy derived from scanning said surface during a first portion of each sweep of said electron beam to one of said output circuits, and applying energy derived from scanning said surface during the remaining portion of said sweep to the other of said output circuits.

2. The device according to claim 1 including a second pair of output circuits, additional switching means synchronized with said electron switching means and said electron beam scanning means for said transmission means, said additional switching means alternately connecting said transmission means to each of said pairs of output circuits, said switching means also, in one position thereof, causing said electron beam scanning means to sweep said surface in one direction thereacross and in another position to sweep said surface in another direction thereacross.

3. A radiant energy sensitive device for a steering control system comprising in combination, a radiant energy sensitive surface, means to direct a target image on said surface, electron beam scanning means sweeping said surface, output circuit means deriving output from the scanning of said surface, said output being proportionate to radiations falling on said surface, separate integrating circuits in said output circuit means, means synchronizing said beam scanning means with said output circuit means, said last named means applying energy output responsive to scanning the area of one portion of said surface to one of said integrating circuits and energy output responsive to scanning another portion of said surface to another of said integrating circuits.

4. The device according to claim 3 including a second output circuit means having separate integrating circuits therein, said means synchronizing said beam scanning means with said output circuit means including switching means in one position thereof causing said electron beam scanning means to sweep said surface in one direction and in the other position to sweep said surface in a direction substantially at right angles to said one direction.

5. A radiant energy sensitive device for a steering control system comprising in combination, a radiant energy sensitive surface, means to direct a target image on said surface, electron beam scanning means sweeping said surface, output circuit means deriving output from the scanning of said surface in response to radiations falling on said surface, separate integrating circuits in said output circuit means, means synchronizing said beam scanning means with said output circuit means, said synchonizing means comprising electronic switching means operated in synchronism with said scanning means applying energy output responsive to scanning the area of one portion of said surface to one of said integrating circuits and energy output responsive to scanning another portion of said surface to another of said integrating circuits.

6. The device according to claim 5 including a second output circuit means having separate integrating circuits, additional switching means synchronized with said electronic switching means and said electron beam scanning means, said additional switching means in one position thereof causing the energy derived from scanning said surface to be applied to one of said output circuits and said electron beam scanning means to sweep said surface in one direction, and in the other position thereof causing the energy derived from scanning said surface to be applied to the other of said output circuits and said electron beam scanning means to sweep said surface in another direction substantially at right angles to said first direction.

7. A radiant energy sensitive device for a target seeking control system comprising a surface formed of discrete, radiant energy sensitive elements, each of said elements storing electrical energy proportional to radiant energy falling thereon, focusing means directing on said surface an image of a target formed by energy rays emanating from said target, cathode ray means releasing the electrical energy stored in said sensitive elements which a cathode ray strikes, scanning means deflecting said cathode ray over said surface, two pairs of output circuits, a pair of amplifiers feeding said output circuits, transmission means conducting the electrical energy released from said light sensitive elements to said amplifiers, gating means connected to the control grid of each one of said amplifiers alternately blocking and unblocking each of said amplifiers in opposite sense with respect to one another, switching means for said scanning means and said pairs of output circuits in one position causing said cathode ray to be deflected in one direction across said surface and the energy derived therefrom to be applied to one of said pairs of output circuits and in another position causing said cathode ray to be deflected in another direction across said surface and the energy derived therefrom applied to the other of said pair of output circuits, and means synchronizing said scanning means, said gating means and said switching means whereby the electrical energy released from said radiant energy sensitive elements during a first portion of each scanning trace across said surface is amplified and applied to one of a pair of said output circuits, and is amplified and applied to the other output circuit of said pair during the remaining portion of each scanning trace.

8. A radiant energy sensitive device for a target seeking control system comprising a surface sensitive to radiant energy falling thereon, focusing means directing on said surface an image of a target formed by rays emanating therefrom, scanning means directing a cathode ray over said surface, a pair of amplifiers, transmission means applying electrical energy derived from said surface in response to radiations falling thereon to the inputs of said amplifier, two pairs of output circuits, switching means alternately switching the outputs from said amplifiers from one pair of output circuits to the other pair of output circuits, one of said amplifiers in one position of said switching means feeding its output to one output circuit of one of said pairs of output circuits and the other of said amplifiers feeding its output to the other output circuit of said one of said pairs, gating means alternatively blocking and unblocking said amplifiers in opposite sense with respect to each other, additional switching means for said scanning means in one position causing said cathode ray to be deflected in one direction across said surface and in another position causing said cathode ray to be deflected in another direction across said surface, and means synchronizing said scanning means, said switching means and said gating means whereby the electrical energy derived from scanning said surface during a first portion of each trace thereacross is amplified and applied to one of a pair of said output circuits and is amplified and applied to the other output circuit of said pair during the remaining portion of each trace.

References Cited in the file of this patent

UNITED STATES PATENTS

| | | |
|---|---|---|
| 1,387,850 | Hammond | Aug. 16, 1921 |
| 1,388,932 | Centervall | Aug. 30, 1921 |
| 1,747,664 | Droitcour | Feb. 18, 1930 |
| 2,143,933 | Barthelemy | Jan. 17, 1939 |
| 2,166,712 | Bedford | July 18, 1939 |
| 2,357,922 | Ziebolz et al. | Sept. 12, 1944 |
| 2,407,936 | Rost et al. | Sept. 17, 1946 |

FOREIGN PATENTS

| | | |
|---|---|---|
| 352,035 | Great Britain | June 22, 1931 |
| 354,768 | Italy | Dec. 7, 1937 |
| 797,933 | France | Feb. 24, 1936 |